United States Patent Office 2,750,415
Patented June 12, 1956

2,750,415

SEPARATION AND OXIDATION OF CYCLOHEXYL NITRATE AND RELATED COMPOUNDS

Clement H. Hamblet, Wilmington, and Doyce B. Hanson, Claymont, Del., assignors to E. I. du Pont de Nemours & Company, Wilmington, Del., a corporation of Delaware No Drawing. Application July 25, 1952,
Serial No. 300,976

4 Claims. (Cl. 260—533)

This invention relates to processes for preparing alkandioic acids. It also relates to a process for separating from certain oxidation products a cyclohexyl nitrate-containing condensate which upon further oxidation yields adipic acid.

Heretofore it was known that adipic acid could be manufactured by nitric acid oxidation of the mixed primary products obtained by liquid phase air oxidation of cyclohexane. As hereinafter disclosed in greater detail, the off-gases produced in the nitric acid oxidizers can be conducted through a cooler or condenser to remove readily condensible material therefrom. It has now been determined that the off-gas condensate thus produced (after removal of the water phase) contains as much as 85 to 90% of cyclohexyl nitrate. Until the time of the present invention there was no known use for this by-product and, for a time, relatively large amounts of it had to be discharged through the waste disposal facilities of the plant.

An object of this invention is to convert cycloalkyl nitrates, and particularly cyclohexyl nitrate, to useful products such as alkandioic acids. Another object is to prepare a cyclohexyl nitrate-containing condensate and to convert such a condensate to adipic acid.

These objects are accomplished in accord with this invention by isolating a cycloalkyl nitrate in pure or concentrated form (e. g. condensing cyclohexyl nitrate from the above-described off-gas) and heating the said cyclohexyl nitrate with aqueous nitric acid of 40% to 70% concentration at temperatures within the range of 62° to 110° C. whereby alkandioic acid is obtained. Temperatures as high as about 62° to 80° C. are generally preferred for initiation of the reaction, and temperatures of about 80° to 110° C. are generally used in the final stage of the oxidation. Promoters for the nitric acid may be present if desired, e. g. copper, vanadium and/or manganese, etc., compounds in concentrations totaling 0.01 to 5% (as metals).

The invention is illustrated further by means of the following examples.

*Example I.*—Cyclohexane was air-oxidized at 142–145° C. under 100 p. s. i. pressure until 12.5% of the cyclohexane was converted to oxidized product. The unreacted cyclohexane was recovered by steam distillation, and the residue was oxidized with 60% nitric acid (0.05% ammonium vanadate and 0.15% Cu nitrate was present) at 60° C. and finally at 110–115° C. The gases formed in this nitric acid oxidation were passed through a condenser cooled by means of cold water. The condensate thus formed contained an oil phase which after extraction with aqueous sodium bicarbonate was chiefly cyclohexyl nitrate having the following properties: B. P. 95°–99° C. at 40 mm.; Dumas N, 9.55% (theory 8.3); Density 1.090; hydrogenation products (Raney Ni, 60°, 200–500 p. s. i., cyclohexanol and ammonia). A 3-necked flask of one liter capacity equipped with a stirrer, reflux condenser, and feed burette was charged with 490 grams of aqueous nitric acid (60% concentration) to which 0.25 gram of ammonium vanadate had been added. Into this mixture at 62°–76° C. was added 118 grams of cyclohexyl nitrate prepared as above-described (time of addition, 77 minutes). The heating was continued for approximately one hour at a maximum temperature of 90° C. From the residue was recovered (by water washing) 91 grams of adipic acid.

*Example II.*—Into a 3-necked flask of one liter capacity, equipped with a stirrer, reflux condenser, and thermometer was placed 327 grams of aqueous nitric acid feed (48% HNO₃, 4.5% non-volatile organic by products from adipic acid manufacture via oxidation products of cyclohexane, and 47.5% H₂O), and 16.5 grams of cyclohexyl nitrate. The mixture was heated slowly to determine the minimum oxidation temperature. There was very little reaction below 65°–70° C. and no perceptible reaction below 60° C. Once the reaction started, it was necessary to cool the mixture (with an ice bath) to control it. The temperature ultimately was permitted to rise to 101° C. without any difficulty being encountered. After about 46 minutes the oxidation was virtually complete. The oxidation product thus obtained was almost exclusively adipic acid.

*Example III.*—One hundred cc. of 60% nitric acid (no catalyst) was heated at 100° C., and cyclohexyl nitrate (15 cc.) was added dropwise while maintaining the temperature virtually constant and agitating the mixture. After the reaction stopped the products were cooled with ice; the resulting crystals were removed by filtration, and recrystallized from water. The melting point of the adipic acid thus produced was 146.5°–149° C.

While the invention is specifically illustrated in the above examples as applied to making adipic acid from cyclohexyl nitrate, it is to be understood that the same process can be applied in the manufacture of alkandioic acids from other cycloalkyl nitrates, e. g. cyclohexandiol dinitrate, cycloheptyl nitrate, cyclopentyl nitrate, etc.

A process for nitric acid oxidation of products formed by liquid phase partial air oxidation of cyclohexane is disclosed in U. S. Patent 2,557,282. The nitrates employed in the practice of this invention include those produced by partial condensation of the off-gases formed in the nitric acid oxidation process of that patent.

We claim:

1. A process for preparing alkandioic acid which comprises oxidizing a cycloalkyl nitrate in the liquid phase with aqueous nitric acid and thereafter separating from the resulting mixture the alkandioic acid produced by the said oxidation.

2. A process for preparing adipic acid which comprises condensing cyclohexyl nitrate from the off-gas produced in nitric acid oxidation of liquid phase cyclohexane partial air oxidation products and thereafter oxidizing the said cyclohexyl nitrate with aqueous nitric acid of 40% to 70% concentration at temperatures within the range of 62° to 110° C. in the liquid phase, whereby adipic acid is produced, and separating adipic acid from the resulting mixture.

3. Process of claim 2 wherein the cyclohexyl nitrate is oxidized with nitric acid initially at a temperature of 62° to 80° C., and finally at a temperature of 80° to 110° C.

4. Process of claim 2 wherein a vanadium compound is present as a promoter.

References Cited in the file of this patent

UNITED STATES PATENTS

| | | |
|---|---|---|
| 2,294,849 | Olin et al. | Sept. 1, 1942 |
| 2,420,938 | Doumani et al. | May 20, 1947 |
| 2,459,690 | Doumani et al. | Jan. 18, 1949 |
| 2,465,984 | Doumani et al. | Mar. 29, 1949 |
| 2,557,282 | Hamblet et al. | June 19, 1951 |